United States Patent [19]
Huang et al.

[11] Patent Number: 4,917,924
[45] Date of Patent: Apr. 17, 1990

[54] FOOD BODY WITH SURFACE COLOR INDICIA

[75] Inventors: Alvin S. Huang, Wheeling; Myron D. Nicholson, Lemont; Rama Ramagopal, Bolling Brook, all of Ill.

[73] Assignee: Viskase Corporation, Chicago, Ill.

[21] Appl. No.: 285,454

[22] Filed: Dec. 16, 1988

[51] Int. Cl.$^4$ .......................... A22C 13/00; D06P 3/60
[52] U.S. Cl. ............................... 428/34.8; 138/118.1; 426/135; 428/195; 428/914; 8/518; 8/685
[58] Field of Search .................. 428/195, 914, 34.8; 138/118.1; 426/135; 8/518, 514, 685

[56] References Cited

U.S. PATENT DOCUMENTS

| | | | |
|---|---|---|---|
| 2,008,018 | 7/1935 | Hemming | 134/28 |
| 2,301,564 | 11/1942 | Menges | 99/176 |
| 2,338,151 | 1/1944 | Weber | 106/24 |
| 2,365,809 | 12/1944 | Ellis et al. | 8/30 |
| 2,948,626 | 8/1960 | Sanders, Jr. | 106/24 |
| 3,539,361 | 11/1970 | Coleman | 99/176 |
| 3,694,237 | 9/1972 | Piotrowski | 106/30 |
| 3,909,284 | 9/1975 | Woznicki et al. | 106/289 |
| 4,384,006 | 5/1983 | Wallick | 426/383 |
| 4,769,246 | 9/1988 | Baldwin | 426/140 |
| 4,776,858 | 10/1988 | Mayer | 8/517 |

FOREIGN PATENT DOCUMENTS 61-13790 4/1986 Japan .

OTHER PUBLICATIONS

Shellac, Edward Hicks, pp. 126–127, Chemical Publishing Co., Inc.
Pigment Handbook, Temple C. Patton, vol. I, pp. 429–430, John Wiley & Sons (1973).
Zein, Freeman Industries, Inc., Tuckahoe, N.Y., five pages (2/85).
Color Mastery With FD&C Aluminum Lakes HT, Colorcon Inc., West Point, Pa., five pages (1986).
"Flexography Principles and Practices", 3rd Edition, published by Flexographic Technical Association, Inc. (1980).

Primary Examiner—James Seidleck
Attorney, Agent, or Firm—John C. LeFever

[57] ABSTRACT

An article comprising a substrate such as cellulose casing, having thereon a desired indicia such as grill marks or a corporate logo. The indicia comprises an aluminum-organic dye lake and a binder-carrier, with the lake dispersed in the binder-carrier and bonded to the substrate by the binder-carrier in a moisture insensitive manner to form the indicia. The organic dye may for example be an FD&C color and the binder-carrier may for example be zein or shellac. The indicia is substantially completely transferable from the substrate to a contiguous edible surface in the presence of water. The food surface may for example be frankfurter and the transfer may for example take place during elevated temperature processing of the frankfurter emulsion in the cellulose casing.

31 Claims, 2 Drawing Sheets

FOOD BODY WITH SURFACE COLOR INDICIA

TECHNICAL FIELD

This invention relates to an article having thereon a desired indicia of organic coloring matter as for example a cellulosic food casing with the organic color indicia on its surface, a processable food package comprising an indicia-containing casing filled with processable food to which the color indicia is transferred during processing, an edible food product with the color indicia on its outer surface as for example processed frankfurter with grill marks, and a method for making the indicia-containing processed food product.

BACKGROUND OF THE INVENTION

As used herein, "indicia" means a distinctive predetermined pattern which the manufacturer of an edible product wishes to have applied on the outer surface of a food product. Indicia includes "logo" which is an intelligible pattern as for example one or more letters, pictures or symbols. Indicia also includes marks which have a pleasing connotation to the consumer, as for example grill marks.

There is a long-standing need for an edible food product with a desired indicia on its outer surface. For example, food processors would like to have their edible product identified by their company logo to indicate high and consistent quality. Also, other types of indicia such as grill marks on frankfurters are desirable for esthetic reasons.

Frankfurters are prepared by processing of moist emulsion at elevated temperature and in a moist environment inside casing, usually manufactured from cellulose, i.e. cellulosic casings. The latter are typically supplied to the food processor in the form of shirred sticks, i.e. highly compressed pleats which may be on the order of 1/150 of their as-manufactured flat length. The shirred stick with one closed end is attached to a stuffing machine which deshirrs and deplugs the closed end of the stick whereupon emulsion is pumped into and fills the casing. The emulsion-filled casing is formed into short links and at high speed, e.g. 250 fpm as it is removed from the stuffing machine. The emulsion is cooked within the casing during the processing step to form a frankfurter. After processing, the cellulosic casing is peeled from the frankfurter outer surface using high speed equipment, e.g. 500 fpm, and the casing is discarded.

For high speed production, the moisture content of the cellulosic casing must be closely maintained during both the shirring and the stuffing steps. This is necessary so that the casing has the necessary flexibility for moving without breakage yet adequate physical integrity for mechanical handling during deshirring and stuffing. Plasticizers such as glycerine are also included in the casing to partially satisfy these requirements.

Those skilled in the food processing art recognize that it is not commercially practical to impart color indicia on frankfurters after processing and casing removal. The prior art has proposed this be done for example by searing the frankfurter to form grill marks, as taught in U.S. Pat. No. 4,384,006. One problem with this approach is the need for additional and complex high speed machinery to match the frankfurter production rate. Another problem is that searing requires penetration of the thin outer skin of the frankfurter, thereby creating a sanitation issue.

Another approach to providing an edible food body outer surface with color indicia is to form the indicia on the cellulosic substrate and then transfer the indicia to the food body outer surface during processing. There are a number of problems to this approach which have not been collectively overcome. The indicia must be formed of material which has been approved by governmental authorities for direct contact with food, and this requirement severely restricts the selection of constituents. Further, the indicia as applied to the substrate should have abrasion resistance. If for example the indicia-containing substrate is food casing to be shirred, the indicia must retain its integrity during extreme distortions of the substrate which are characteristic of the pleat-forming and compression steps of shirring, as well as pleat elimination and straightening out of the casing during the succeeding inflation and stuffing. Even if the casing is not shirred but instead rolled and fed to the stuffing machine as roll stock, there is considerable distortion by virtue of the bending and compression of the casing to form roll stock.

A further requirement is that the indicia must not cause transfer ("ink-offsetting") or even "blocking" during handling or storage of indicia-containing substrate, i.e. transfer or even adhesion to either the substrate or another indicia when different substrate portions are pressed together as for example in shirring, rolling or stacking.

Another requirement of any food casing color indicia system is that the indicia must be moisture insensitive. That is, the color indicia must be insoluble in water at ambient temperature because the casing itself must contain substantial moisture in the as-manufactured condition, as previously explained. If shirring is to be employed, the casing is further moisturized during shirring. A color indicia which is even partially soluble in water would smear and could not transfer as a clearly defined sharp indicia.

Still another requirement of a food casing color indicia system is that the indicia must substantially completely transfer to the contiguous edible surface with sharp definition. Less than complete transfer would result in an indicia which has poor definition, unevenness or be too faint when compared with the surrounding surface.

Color indicia may possibly be formed from dyes or pigments, but there are serious limitations with each approach. Water soluble dyes are extremely moisture sensitive, i.e. they tend to run away from the as-applied indicia leaving at best a fainter mark with poor definition. Solvent soluble dyes are not moisture sensitive but are not approved by governmental authorities for human consumption. On the other hand, organic pigments are unavailable in certain colors as for example brown, and in general are not approved by governmental authorities for human consumption.

An object of this invention is to provide an article comprising a substrate with a desired color indicia thereon which is approved for direct contact with food, moisture insensitive, and which is substantially completely transferable from the substrate to a contiguous edible surface.

Another object is to provide a processable food package comprising a casing filled with processable food in direct contact with the casing inner surface, the latter having thereon a desired color indicia which is substantially completely transferable from the casing inner surface to the food outer surface during in-situ processing of the food.

A further object is to provide an edible food product having on its outer surface a desired color indicia.

A still further object is to provide a method for making processed food product in which a casing with a desired color indicia on its inner surface is stuffed with a processable food mass, the color indicia is substantially completely transferred to the food mass outer surface during food-processing and the casing is thereafter removed from the processed food mass without loss of the color indicia on the food mass outer surface.

Other objects and advantages of this situation will be apparent from the ensuing disclosure and appended claims.

SUMMARY OF INVENTION

One aspect of this invention comprises a substrate having thereon a desired indicia comprising an aluminum-organic dye lake and a binder-carrier, with said lake dispersed in said carrier and bonded to the substrate by the binder-carrier in a moisture insensitive manner to form the indicia. The latter is substantially completely transferable from the substrate to a contiguous edible surface in the presence of water.

Another aspect of this invention is a processable food package comprising a casing or tube filled with water moisture-containing processable food having its outer surface in direct contact with the casing inner surface. The latter is a substrate for an aluminum-organic dye lake and a binder-carrier. Preferably the casing is either cellulosic or formed from thermoplastic film. The lake is dispersed in the binder-carrier and bonded to the casing inner surface by the binder-carrier in a moisture insensitive manner as a desired indicia. The indicia is substantially completely transferable from the casing inner surface to the water moisturized food outer surface during processing thereof in the casing.

A further aspect of the invention is a method for making an indicia-containing processed food product as for example frankfurter having spaced grill-like marks on its surface. In this method a casing article is provided having a inner surface with an aluminum-organic dye lake and a binder-carrier on the inner surface as a substrate, in a desired indicia. The lake is dispersed in the binder-carrier and bonded to the substrate by the binder-carrier in a moisture insensitive manner to form the indicia. In this method, the casing is filled with water moisturized processable food such that the water moisturized food outer surface is in direct contact with the indicia on the casing inner surface. The food-containing casing is processed at elevated temperature to cook the food and simultaneously substantially completely transfer the indicia from the casing inner surface to the processed food outer surface. The casing article is then peeled from the indicia-containing processed food outer surface. In a preferred embodiment of this method the indicia is bonded to the casing outer surface and the casing article is thereafter inverted to position the indicia on the casing inner surface prior to filling same with food.

A still further aspect of the invention comprises a processed food body having on its outer surface a desired indicia of aluminum-organic dye lake and a binder-carrier. The lake is dispersed in the binder-carrier and bonded to the food body outer surface by the binder-carrier.

DETAILED DESCRIPTION

The preferred substrate of this invention is cellulosic food casing prepared by the well known viscose-xanthation process. In the latter, high quality relatively pure cellulose pulp (either cotton or wood) is first converted to alkali cellulose by steeping in a sodium hydroxide solution, dried and shredded. After a preferred aging step, xanthation—the conversion of alkali cellulose to xanthate cellulose—is accomplished by reaction with carbon disulfide. The purpose of xanthation is to enable dispersion of the cellulose in a dilute solution of sodium hydroxide. This is the viscose formation step in which sodium hydroxide is absorbed onto the xanthate cellulose which becomes highly swollen and dissolves over a finite time period. Viscose is essentially a solution of cellulose xanthate in a solution by sodium hydroxide which has been aged to a specific degree of precipitability.

To form a casing the viscose is extruded into a tubular cellulose film, which is converted to cellulose in the extrusion bath by action of acid-salt, for example sulphuric acid and sodium sulphate. The resulting cellulose casing is preferably passed through several dilute acid baths to insure completion of the regeneration and to further remove water.

The casing may also be reinforced, as for example by paper, commonly referred to as "fibrous" casing. This may be accomplished by coating the viscose on one or both sides of a paper sheet prior to extrusion.

The cellulose casing substrate embodiment of the present invention may also contain other ingredients which are conventionally used, e.g. glycerine and/or propylene glycol as humectants or softening agents. Agents for improving the peelability of the casings from food products may be optionally coated on the food contacting surface, as for example carboxymethyl cellulose and other water soluble cellulose ethers as described in U.S. Pat. 3,898,348. Other suitable peeling aids include "Aquapel", a Hercules, Inc. trademarked product comprising alkyl ketene dimers, the use of which is described in U.S. Pat. No. 3,905,397, and "Quilon", a DuPont Company trademarked product comprising fatty acid chromyl chlorides the use of which is described in U.S. Pat. No. 2,901,358.

Liquid smoke may be added to the casing substrate embodiment for color and flavor transfer to the food product during processing. This treatment may be with "as-is" tar-containing liquid smoke as for example described in U.S. Pat. No. 4,377,187 or with tar-depleted liquid smoke as for example described in U.S. Pat. No. 4,492,918. In this embodiment the indicia may be applied to the casing substrate either before or after the liquid smoke treatment.

For practicing this invention in connection with food casings as the indicia substrate, the invention of copending U.S. patent application Ser. No. 07/191100 filed May 6, 1988 in the names of J. A. Oxley and M. D. Nicholson is preferably employed. In this respect, one surface of the casing is provided with an indicia in mirror image to the indicia desired on the surface of the edible product. During stuffing, the casing surface carrying the indicia is brought into direct contact with the edible product stuffed into the casing. The indicia releases from the casing surface and transfers to the surface of the food product so that after stuffing and processing a mirror image of the indicia remains on the surface of the edible product when the casing is removed.

Casing processing and shirring operations performed after application of the indicia material to the casing should not smear or distort the indicia. Otherwise, the indicia, when transferred to the processed edible product, is blurred and/or distorted. Application of the indicia material is most easily accomplished by passing the casing through an applicator which prints or otherwise applies a mirror image of the desired indicia or pattern onto the surface of the casing.

Preferably the indicia is applied to the outer surface of the casing. Thereafter, the casing is turned inside out so the indicia is on the inside or edible contacting surface. Inverting the casing can be accomplished prior to stuffing or during stuffing. U.S. Pat. No. 4,162,557 discloses a method for inverting casing prior to stuffing whereas U.S. Pat. No. 4,162,693 discloses a method for inverting casing during stuffing. Both of these patents are incorporated herein by reference.

The casing can be shirred in a conventional manner with the indicia on the exterior surface of the casing. If this is done, the casing may be inverted during stuffing to place the indicia on the inside of the casing and intimate contact with the food products stuffed into the casing.

As an alternative, the casing with the indicia on its exterior surface can be inverted and then shirred. This places the indicia material on an inside surface of the casing so there is no need to invert the casing during stuffing.

It is conventional during the course of shirring a cellulosic casing to spray the interior surface of the casing with an aqueous solution. For example, U.S. Pat. No. 3,981,046 describes a conventional humidification technique in which an aqueous solution is applied as an internal spray to humidify the casing to raise the moisture content of the casing to a level better suited for shirring and subsequent stuffing.

Application of the indicia material onto the exterior surface of the casing is preferably accomplished "off-line" after the casing manufacturing process is complete, or alternatively "in-line" as part of the casing manufacturing process.

Figure 1:
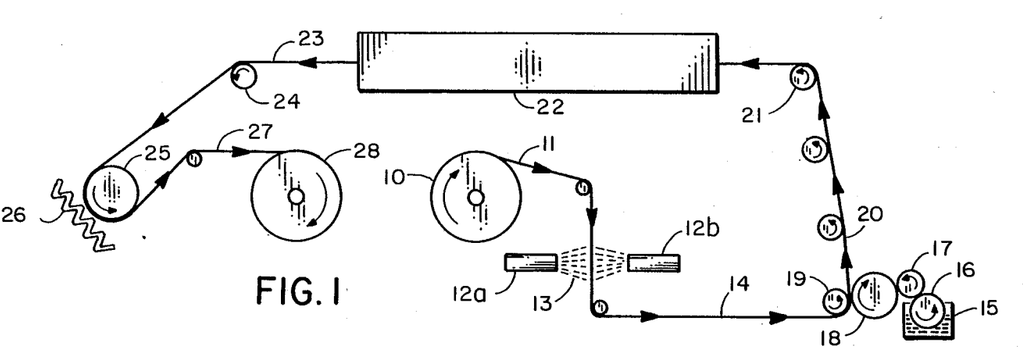
FIG. 1 is a schematic representation of a flexographic system suitable for bonding indicia on the outer surface of a substrate as for example flattened cellulosic casing.

Referring now to the FIG. 1 schematic flexographic printing system, the indicia substrate as for example tubular cellulose food casing is unwound from reel 10. This casing which is unwound in flattened form 11, typically has an as-manufactured moisture content of about 15 wt. % water (bone dry basis). This flat casing is directed by at least one guide roll to a further moisturizing system which for example may comprise spray members 12a and 12b positioned for discharging water spray 13 on both flat surfaces of the semi-finished casing substrate. The purpose of this further moisturization to about 19 wt % water (bone dry basis) is to compensate for the water lost in the indicia dryer downstream from the indicia application section (discussed hereinafter).

The further moisturized flat casing 14 is directed to the indicia application system (sometimes referred to in the art as a printing head) including indicia mixture supply pan 15 and fountain roll 16 positioned for partial immersion in the indicia mixture pool during rotation. Fountain roll 16 is provided with a flexible outer surface capable of receiving the indicia mixture and holding same by surface tension. The indicia mixture-containing fountain roll 16 contacts anilox roll 17 having an etched outer surface with many cells to hold the transferred mixture. Anilox roll 17 in turn contacts cylinder 18 having a printing plate mounted on its outer surface. The latter may for example comprise a rubber strip containing the desired indicia or pattern. The indicia mixture is transferred from anilox roll 17 to the printing plate of cylinder 18.

The further moisturized flat cellulose casing 14 is directed by backup roll 19 into contact with the indicia mixture-dispensing circular printing plate on the outer surface of cylinder 18. The desired indicia are thereby deposited on the cellulose casing outer surface as a supporting substrate in adhering relation thereto, forming the indicia-containing further moisturized flat cellulose casing 20. The latter is directed by a series of guides and roll 21 to the inlet end of dryer 22, it being understood that additional printing heads would be included downstream the first printing head if additional colors are needed to form the desired indicia.

The indicia-containing flat cellulose casing 20 is passed through dryer 22 where it is heated by conventional means (e.g. steam coils or heated gas) to sufficient temperature as for example 60°–80° C. and for sufficient duration to vaporize the solvent component of the indicia mixture and dry the indicia on the cellulose substrate. Moisture is of course also evaporated from the cellulose substrate during the indicia drying, and the water content of the dried indicia-containing flat cellulose casing 23 discharged from the dryer 22 may be about 14 wt. % $H_2O$ (bone dry basis). This is about the same moisture content as the casing 11 unwound from reel 10. As previously explained, the purpose of further moisturizing system 12a–12b is to add sufficient water to compensate for that loss in dryer 22. This moisture level (and additional moisture) is needed if the indicia-containing casing 23 is to be shirred. It is also preferred for maintaining physical integrity of the cellulose casing during the various processing steps of the flexographic printing system. This will avoid cracking or breaking because of excessive rigidity on one hand, and yet the cellulose casing will not contain so much moisture as to be non-self supporting.

The dried indicia-containing flat cellulose casing 23 discharged from dryer 22 is hot and may for example be at 60°–80° C. It is directed by guide roll 24 for transport around chill roll 25 for cooling by cold water jacket 26 to relieve thermal stresses. The so-cooled, dried indicia-containing flat casing 27 is rewound on roll 28 for storage until needed for further processing, preferably including shirring, prior to transport to customer packing houses.

Figures 2, 3:
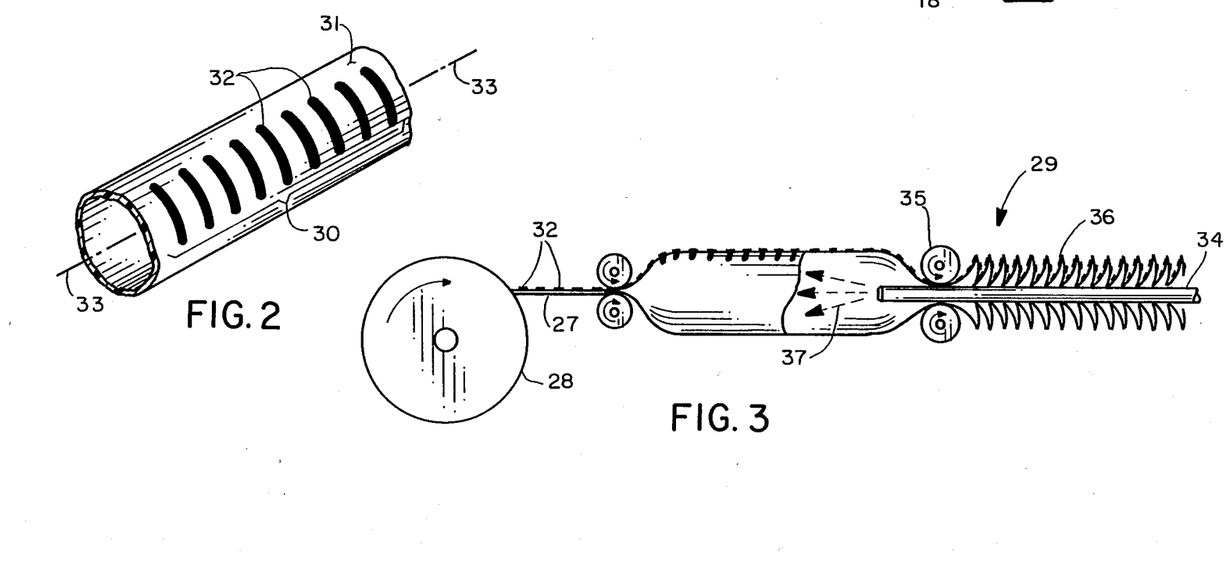
FIG. 2 is an inflated cellulose food casing substrate having spaced indicia on its outer surface in the form of grill marks.
FIG. 3 is a schematic representation of a system for shirring the indicia-containing cellulose casing article of FIG. 2 with the indicia on the casing outside surface.

FIG. 2 illustrates one casing embodiment of the article aspect of the present invention wherein the indicia 30 is formed of a mixture comprising an aluminum organic dye lake and a binder-carrier. As shown, the indicia 30 is in the form of a repeated ordered indicia bonded to and extending along the casing exterior surface 31. The repeated order derives from applying the indicia onto casing exterior surface 31 as the casing 14 moves at a relatively constant speed across a printing wheel 18 rotating at the same speed (FIG. 1). The particular indicia illustrated in FIG. 2 is composed of a plurality of short parallel line segments 32- disposed transverse the longitudinal axis 33 of the casing to simulate grill marks.

The grill marks 32 are disposed on a surface of the casing adapted to come into direct with the food product stuffed into the casing. Since the indicia 30 is disposed on an exterior surface 31 of the casing and is substantially nondiffusible into and through the casing wall, the casing must be inverted either before or during stuffing to locate the pattern 30 on the inside of the casing.

Figures 4, 5, 6, 7:
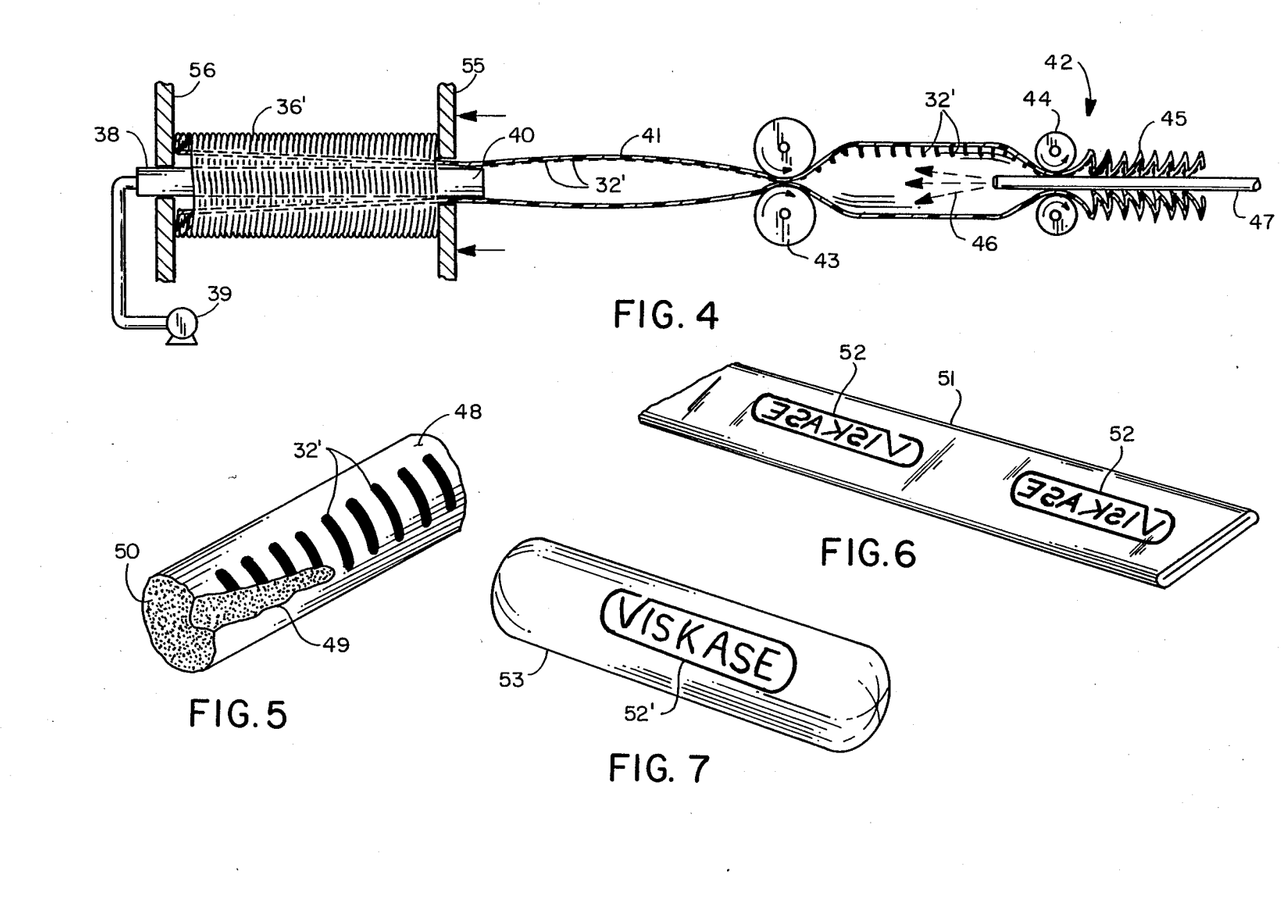
FIG. 4 is a schematic representation of a system for first loosely shirring the FIG. 2 article, inverting and then reshirring the article with the indicia on the casing inside surface.
FIG. 5 is a frankfurter with spaced indicia on its outer surface, which can be prepared using the FIG. 2 indicia-containing casing article using the shirring systems of FIG. 3 or 4.
FIG. 6 is a flattened casing substrate with a mirror image corporate logo as the indicia on its outer surface.
FIG. 7 is a frankfurter with the FIG. 6 logo on its outer surface.

FIGS. 3 and 4 illustrate alternative methods for shirring the indicia-containing casing illustrated in FIG. 2. In FIG. 3, reel 28 from FIG. 1 comprises indicia-containing casing article 27 having indicia composed of a pattern of grill marks 32 on its outer surface. Casing from this reel is unreeled and fed directly to a conventional shirring machine generally indicated at 33. Shirring proceeds in a conventional manner in that the casing article 27 is inflated and fed onto a mandrel 34. The casing passes along the mandrel and through a conventional shirring head 35 which gathers the casing into pleats and forms a shirred stick indicated at 36. The shirring mandrel 34 is hollow so that an aqueous shirring solution can be delivered as a spray 37 to the interior of the casing. As mentioned hereinabove, a conventional shirring solution includes a water phase. This is applied in an amount sufficient to rehumidify the casing in order to raise the moisture content from about the 14% level of the reeled casing to a level suitable for shirring and stuffing. In the shirring method as shown in FIG. 3, the total moisture added by the shirring solution would be about 12% to 14% in order to raise the casing moisture content from about the 14% level of the reeled casing to about 26% to 28% (bone dry basis).

The shirred stick 36 formed in this fashion contains casing having the indicia e.g., pattern of grill marks 32, on an outside surface. Accordingly, this stick would be inverted during stuffing so as to locate the pattern of grill marks 32 on the inner surface (i.e. the food contacting surface) of the casing. Inversion during stuffing ("reverse stuffing") is accomplished by turning and passing the casing through the bore of the stick as generally shown, for example, in U.S. Pat. Nos. 4,292,711 and 4,162,693.

During reverse stuffing the stick end closure is pushed through the entire length of the stick, as shown for example in U.S. Pat. No. 4,292,711. For this reason an end closure of the type disclosed in U.S. Pat. Nos. 4,759,100 and 4,693,280 is preferred, particularly such end closure having a relatively long plug of casing length which is not tightly compressed. The reduced compression plug results in an end closure having a lower deplugging force through the stick bore. Another preferred feature of a reverse stuffing system is a low friction stuffing horn such as one having a "Teflon" coated surface to reduce drag during movement of casing across the surface.

Shirred sticks for the production of frankfurters are usually twisted during shirring to improve the straightness of the stick as disclosed for example in U.S. Pat. Nos. 3,398,069 and 4,649,961. When using reverse stuffing and a stuffing machine of the type shown in U.S. Pat. No. 3,115,668 (FAM Machine) to produce frankfurters, there is preferred direction of twist. In this respect, the FAM Machine rotates the shirred stick about the stuffing horn during stuffing. For reverse stuffing it is preferred to use a stick which has been twisted, during the preceding shirring step, in a direction which is opposite to the direction of the rotation of this stick on the stuffing horn of the FAM Machine. This opposite direction of stick twist will counteract a tendency of the deshirred casing (passing through the bore of the stick) to twist about the stuffing horn. Unless counteracted, the twisting of the deshirring casing about the stuffing horn may cause the casing to bind and seize to the horn and break.

During reverse stuffing it is also preferred to maintain a clearance between the stuffing horn and the inner peripheral surface of the stick. This will provide a clear passage for the deshirring casing and further help to avoid binding of the deshirred casing to the horn. Maintaining a clearance space is accomplished preferably by a thrust collar which is positioned around and pressed axially against the deshirring end of the rotating shirred stick. Such a thrust collar will maintain coaxial alignment of the stuffing horn and a shirred stick, and avoid eccentric rotation of the stick about the horn. The FAM Machine has a follower which pushes against the end of the shirred stick. Modifying this conventional follower to receive a thrust collar for purposes described hereinabove is well within the skill of the art and the thrust collar per se forms no part of the present invention.

It should be appreciated that the deshirring force for reverse stuffing is substantially higher than for conventional stuffing, so that in a particular reverse stuffing system it may be desirable to reduce the required force to avoid casing breakage. Those skilled in the art will appreciate that the deshirring force may, for example, be reduced by using a surfactant such as one or more alkylene oxide adducts of fatty acids or fatty acid partial esters, e.g. "Tween 80" manufactured by Atlas Chemical Industries, Inc. or "Mazol 80" a product of Mazol Chemicals, Inc., in the shirring solution to form a surfactant layer on the casing. Another approach to lower the deshirring force is the use of lower density shirring in compression (i.e., lower pack ratio) than the otherwise maximum value obtainable. This will reduce the drag effect of the deshirring casing because a less tightly packed or compressed casing will deshirr more easily and with less force than a tightly packed casing. Still another technique for reducing the deshirring force is to use shorter than conventional shirred lengths which also reduces the drag effect as the deshirring casing passes through the bore of the shirred stick.

On the other hand, the deshirring force should not be reduced to the level at which the shirred casing stick coherency is substantially reduced, as this would prevent normal handling without damage.

In one successful demonstration of reverse stuffing, a size 24 (1.26 inch flat width) nonreinforced cellulosic casing was used to produce a shirred stick. The latter's pack ratio was 82, the shirred stick length was 14 inches and a centering type thrust collar was used at the stick deshirring end. This casing was stuffed at a commercial rate of about 220 ft/min. with no casing breakage using a FAM Machine.

In FIG. 4, casing with the indicia on its outer surface is shirred as in FIG. 3 but preferably loosely. The resulting loosely shirred article 36' is then placed on a hollow mandrel 38. To prevent article 36' from slipping off mandrel 38, a support member 55 is disposed at the end of article 36'. The support member 55 may also be biased in a conventional manner (not shown) such as by air or spring means, so as to continuously be a support for shirred article 36' as it is being deshirred. In addition, a second support member 56 can be disposed at the opposite end of shirred article 36' thereby maintaining and fixing article 36' between members 55 and 56. Coupled to one end of mandrel 38 is an air supply pump 39.

The end of the loosely shirred article 36' proximal the air supply end of mandrel 38 is deshirred and fed through the bore of the loosely shirred article 36' and transported over the opposite end 40 of mandrel 38 where the casing becomes inflated through activation of the air pump 39. As the end of shirred article 36' against support member 55 is deshirred and fed through the bore of article 36', the length of the article will become progressively smaller. Support 55 is biased to the left as shown by the arrows in FIG. 4 to maintain a supporting contact with the shirred article. This support arrangement will effectively prevent shirred article 36' from slipping off the mandrel 38.

The inflated casing 41 now has the indicia 32' on its inner surface, and is reshirred by movement through second shirring machine 42. After passing through squeeze rolls 43 shirring proceeds in a conventional manner by passing the casing through shirring head 44 which gathers the casing into pleats and forms a shirred stick indicated at 45. The shirring solution spray 46 is delivered through the outlet of mandrel 47.

This loose shirring—inversion second shirring system is of the type described in U.S. Pat. No. 4,162,557 and locates the indicia on the inside of the casing. Alternatively, the casing article 27 from reel 28 (FIG. 2) may be first unreeled, loosely shirred and cut from the supply reel. These shorter shirred lengths are then inverted and rewound onto a new reel. The casing is then unreeled and fed directly to the second shirring machine 42.

FIG. 5 illustrates a skinless frankfurter 48 made in the FIG. 2 casing. The frankfurter has a pattern on its outer surface derived from indicia material applied to the casing in which the frankfurter was made. In the embodiment shown, the pattern simulates grill marks 32' in mirror image to the pattern 30 on the casing (FIG. 2). It should be noted that the grill marks are composed of the lake-containing indicia coloring material indelibly transferred to the frankfurter surface. As shown in FIG. 5, the grill marks 32' are restricted substantially to the frankfurter surface 49 and the coloring material does not to any significant extent diffuse into the body 50 of the frankfurter beneath the surface.

FIG. 6 illustrates a flat cellulose casing 51 having on its outer surface, indicia in the form of a corporate logo 52 with adjacent logos longitudinally spaced from each other and formed in the mirror image of the desired indicia.

FIG. 7 illustrates a skinless frankfurter 53 made using the casing embodiment of FIG. 6. Here the frankfurter carries the indicia comprising a corporate logo 52' which is in mirror image to the logo 52 on the casing 51.

Lakes

This invention requires use of lakes, and to understand their characteristics it is necessary to distinguish between dyes and pigments. Dyes are chemical compounds which exhibit their coloring power or tinctorial strength when dissolved in a solvent. Pigments are insoluble colored materials which color by dispersion. A lake is a pigment formed by precipitation and absorption of a dye on an insoluble base. Lakes useful in this invention are prepared from aluminum hydrate and organic dyes, i.e. the dye is absorbed on the hydrate. The exact nature of the absorption is not fully known. However, those skilled in the art understand that the manner of preparation of the aluminum hydrate and the conditions under which the dye is added or absorbed determine the shade, particle size, dispersibility, and even tinctorial strength of the lake. Other important production variables are the temperature, the concentration of the reactants, the final pH of the reaction and the nature and time of mixing.

Although lakes useful in the present invention are characterized as "aluminum lakes", it should be understood that minor portions of other hydrates or salts may be included in the aluminum lake, as for example barium and calcium. Having aluminum hydrate as the dye deposition base, the lakes useful in this invention are insoluble in nearly all solvents at pH less than 9.

Other additives with special properties may be included in the present lakes, for example liquid smoke to impart color, flavor and odor to the indicia.

Organic Dyes

As will be hereinafter demonstrated, unlaked dyes are not suitable for use in the invention because of their solubility and bleed characteristics. These qualities make dye transfer from a substrate to an edible surface fuzzy and illegible.

Although any organic dye in laked form is functionally suitable for use in the present inventions, there are stringent governmental restrictions on this selection because the indicia formed therefrom is directly adhered to an edible surface. Accordingly, the selected organic dye must be suitable for human consumption, and in the United States must be certified as "food-approved" by the Food and Drug Administration. Organic dyes in this category are generally referred to as "FD&C" types, and the following is a current list of the FD&C colors.

FD&C Colors

| Designation | Common Name | Chemical Name |
|---|---|---|
| Red No. 3 | Erythrosine | Disodium salt of 9(o-carboxyphenyl) 6-hydroxy-2, 4, 5, 7-tetraiodo-3H-xanthen-3-one. |
| Red No. 40 | None | Disodium salt of 6-hydroxy-5-[(2-methoxy-5-methyl-4-sulfophenyl)azo]-2-naphthalenesulfonic acid. |
| Yellow No. 5 | Tartrazine | 5-oxo-1-(p-sulfophenyl)-4-[(p-sulfophenyl)azo]-2-pyrazoline-3-carboxylic acid, trisodium salt. |
| Yellow No. 6 | Sunset Yellow FCF | Disodium salt of 1-p-sulfophenylazo-2-naphthol-6-sulfonic acid. |
| Green No. 3 | Fast Green | Disodium salt of 4-{ [4-(N- |

-continued

| Designation | Common Name | Chemical Name |
|---|---|---|
| | FCF | ethyl-p-sulfobenzyl amino)-phenyl]-(4-hydroxy-2-sulfonium phenyl)-methylene}-[1-(N-ethyl-N-p-sulfobenzyl)-$\Delta^{2,5}$-cyclohexadienimine]. |
| Blue No. 1 | Brilliant Blue FCF | Disodium salt of ethyl [4-[p[ethyl (m-sulfobenzyl) amino]-a-(o-sulfophenyl) benzylidene]-2,5-cyclohexadien-1-ylidene] (m-sulfobenzyl) ammonium hydroxide inner salt. |
| Blue No. 2 | Indigotine | Disodium salt of 5,5'-disulfo-3-3'-dioxo-$\Delta^2$, 2'-biindoline. |

It will be appreciated by those skilled in the art that secondary colors may be prepared from the above-listed primary colors to form an organic dye of virtually any desired tint. The resulting secondary color dye may then be used to form an indicia of the desired color through laking. For example, the following is a representative list of brown-type colors which may be formulated by blending FD&C dyes:

| Shade | FD&C Dye | Blend |
|---|---|---|
| Butterscotch | Yellow #5 | 74 |
| | Red #40 | 24 |
| | Blue #1 | 2 |
| Chocolate | Red #40 | 52 |
| | Yellow #5 | 40 |
| | Blue #1 | 8 |
| Caramel | Yellow #5 | 64 |
| | Red #3 | 21 |
| | Yellow #6 | 9 |
| | Blue #1 | 6 |

Alternatively, brown FD&C dye may be purchased in the premixed form.

It should also be understood that to obtain a desired tint in the indicia, the intensity of an aluminum-organic dye lake may be lightened by several techniques as for example including an FD&C white tint based on titanium dioxide or by adding extending pigments such as barium sulfate.

Binder-Carrier

The binder-carrier performs several functions in this invention. Firstly, it acts as a dispersant for the aluminum-organic dye lake, since the dye is insolubilized by the laking process. The aluminum-organic dye lake (usually commercially available in powder form) is thoroughly milling and dispersed in the binder-carrier and ground into small particles on the order of 2–20 microns size, as by mixing and/or high speed homogenization. Then the mixture is applied to the flexible substrate as for example by commercially available printing equipment such as the flexographic or rotogravure types. Alternatively, it may be possible to use screen printing or rotary printing systems.

The binder-carrier also serves to bond the aluminum-organic dye lake to the substrate in the desired indicia. As the indicia must be moisture insensitive, the binder-carrier must be water insoluble. When dried on the substrate, the binder-carrier must also form a physical bond between the aluminum-organic dye lake and the substrate, which bond can withstand shear forces. That is, the bond is preferably abrasion resistant. Those skilled in the art will recognize that in the dried condition, each aluminum-organic dye lake particle is surrounded by the binder-carrier.

A preferred characteristic of the binder-carrier is that it provides strong bonding between the indicia and the substrate, so as to withstand compression due to rolling or stacking of the substrate.

A further requirement of the binder-carrier is that it must be retained on the outer surface of the substrate, and not migrate into the substrate interior. If this were to occur, the binder-carrier would probably carry a portion of the aluminum-organic dye lake under the substrate surface and it would be difficult if not impossible to subsequently transfer this portion of the lake to the edible surface. For this reason, it is preferable to use relatively high molecular weight material as the binder-carrier, which is too big to physically enter the substrate interior.

A still further requirement of the binder-carrier is that it must be capable of substantially complete transfer from the substrate to a contiguous edible surface in the presence of moisture, and carrying the aluminum-organic lake in this transfer. In many end uses of the inventive article, this transfer occurs during elevated temperature processing, i.e. cooking of the food body while encased in the aforementioned substrate in the form of a casing. However, it has been discovered that with at least certain embodiments the transfer from the substrate to an edible surface may be effected at ambient temperature.

The mechanism of the substrate-to-edible surface transfer is not fully understood but is probably due to a difference in the bonding forces between the substrate and the dried mixture of aluminum-organic dye lake and binder-carrier ("substrate bonding") on one hand, and between the edible surface and the dried mixture ("edible surface bonding") on the other hand. Apparently, the edible surface bonding sufficiently exceeds the substrate bonding for substantially complete transfer of the indicia from the substrate to the edible surface. As used herein, "substantially complete transfer" means that the transferred indicia covers substantially the entire area of edible surface in contiguous contact with the area covered by the original indicia on the substrate. It does not necessarily mean that substantially all of the mixture forming the substrate indicia is transferred to the edible surface.

The preferred binder-carriers in the practice of this invention are shellac and zein. Shellac is an insect-exudate from Asia, and zein is water insoluble prolamine protein from corn gluten. Zein is preferred because it is approved by the U.S. Food and Drug Administration for use in food. Other suitable binder-carriers may include nitrocellulose lacquers, vinyl lacquers, acrylic vinyls and polyamides, probably in modified form. As will be demonstrated in Example 1 and Table B, certain of these vehicles by themselves do not appear to provide all of the required and preferred characteristics for use as binder-carriers in the practice of this invention. That is, they do not facilitate substantially complete transfer from the substrate to the edible surface, or they do not provide the preferred characteristic of abrasion resistance. However, these deficiencies can probably be overcome by the use of other resin or plasticizer modifiers as for example ethylene vinyl acetate resin, polyester resin, dibutyl phthalate plasticizer or tricresyl phosphate plasticizer.

Substrate

The substrate, to which the mixture (comprising an aluminum-organic dye lake and binder-carrier) is bonded in a desired indicia, is preferably nonporous. That is, the substrate is preferably substantially impenetrable by the aforementioned mixture. If the substrate is porous, the mixture in part enters the substrate inner body. Using only contiguous contact under conventional processing conditions for edibles, it then becomes more difficult to withdraw substantially all of the indicia mixture from the substrate inner body and transfer same as part of the indicia from the substrate to the contiguous edible surface. Also, during elevated temperature processing, a flowable food such as an emulsion may in part enter the substrate main body and form a strong bond preventing separation of the porous substrate and the indicia-containing food body. This was demonstrated by Example 3 wherein indicia-containing paper and the paper side of fibrous cellulose casing could not be peeled from frankfurter without tearing the meat surface.

The substrate should preferably be flexible. This means that it should be capable of contouring to the mixture-dispersing printing surface (as for example a roller), for indicia deposition thereon in a substantially uninterrupted manner. Then the so-contoured indicia containing substrate must retain its physical integrity in assuming a possibly different contour or contours for handling and storage, e.g. in flat form until needed for indicia transfer to the contiguous edible surface. Since the latter is not necessarily itself flexible, the indicia-containing substrate should preferably be able to assume a possibly still different contour for the edible surface contiguous contact necessary to substantially completely transfer the indicia to the edible surface.

To assure flexibility, certain types of substrates require plasticizers. For example cellulosic substrates such as food casing must include plasticizer, most commonly polyhydric alcohols such as glycerine. Other substrates as for example thermoplastic films may not require a separate plasticizer compound for flexibility.

The substrate is preferably smooth surfaced to both assure that the mixture of aluminum-organic dye lake and binder-carrier contacts substantially the entire substrate surface for bonding thereto, yet can be substantially completely transferred therefrom to the contiguous edible surface. If the substrate has substantial texture the mixture may only contact the ridges and not flow to the craters, leaving the low crater portions uncolored. The same deficiencies in the substrate indicia may then be transferred to the edible surface. Even if the mixture reaches the craters of a textured surface, this portion of the indicia may not intimately contact the edible surface, resulting in less-than-complete transfer. On the other hand, it should be recognized that for some edible surface indicia the color need not be perfectly continuous but instead in the form of colored sections at least partially surrounded by uncolored sections. An example of the latter is the so-called "process" type of printing in which the indicia color comprises small dots surrounded by uncolored background.

Although the preferred substrate is cellulose casing, other materials are suitable as for example a substrate formed from a thermoplastic film, preferably in the form of a casing. The film may for example be ethylene vinyl acetate (EVA), a copolymer of vinyl chloride and vinylidene chloride (saran), or polyethylene. The latter broad category includes for example, high density polyethylene, medium density polyethylene and low density polyethylene, as these sub classifications are understood by those skilled in the art. Another preferred type of polyethylene is a copolymer of ethylene and an alpha olefin having between 3 and 8 carbon atoms, generally known as very low or ultra low density polyethylene. Moreover, the film substrate may be the innermost layer of a multilayer film which for example includes an oxygen barrier layer as a core. Suitable well-known core layer materials include ethylene vinyl alcohol (EVOH), nylon, saran and a copolymer of vinyl chloride and methyl acrylate (MA saran). If a multilayer film is used with a core layer, there are preferably at least three layers comprising the innermost substrate layer on which the indicia are printed, the core-barrier layer and an outer layer preferably selected to provide high resistance to puncture and abuse. Suitable materials for the outermost layer include EVA and the various polyethylenes.

Edible Surface

The edible surface to which the indicia is transferred may be primarily carbohydrate such as pie dough or bread, or protein such as frankfurter, ham or poultry such as turkey. The edible surface may also be mixtures such as turkey-bologna lunch meat. The edible surface may also be protein such as cheese.

Transfer in Presence of Water

Either or both the indicia substrate and the edible surface must contain water moisture or the transfer must be in a highly water moisturized environment. This requirement is most conveniently satisfied by the water moisture in edible bodies. Moisture is needed because the indicia is at least partially permeable and moisture appears to be uniquely able to penetrate the indicia and weaken the indicia binder-carrier bonding to the substrate.

This was demonstrated in a series of tests described hereinafter in detail as Example 4, employing bread. The indicia could not be transferred to dry bread or to bread containing only nonaqueous fluid. In contrast, the indicia was substantially completely transferred to water moisturized bread.

In another test hereinafter described in detail in Example 5, it was demonstrated that the unglazed side of a water moisturized ceramic tile would not function as an indicia-receiving surface even at elevated temperature of 50° C. This is probably because insufficient water was available at the substrate-tile interface.

Indicia

In the practice of this invention, the mixture of aluminum-organic dye lake and binder-carrier is bonded to the substrate as an indicia in a moisture insensitive manner and preferably in an abrasion resistant manner, for reasons already discussed.

As used herein "abrasion resistant manner" means that less than about 50% of the indicia surface area separates from the substrate when subjected to the Dry Scratch Test (hereinafter described). This performance standard is adequate when the indicia-containing substrate is to be used in a manner where the shear forces are minimal, as for example when the substrates are physically stacked or rolled in overlying compressive relationship for storage prior to transfer to the edible surface. However, when the indicia-containing substrate is to be used in a manner where the shear and torsion forces are extremely high, as for example on shirred cellulose food casings, the mixture is more preferably bonded to the substrate as an indicia in a "high abrasion resistant manner". As used herein "high abrasion resistant manner" means that the indicia will not only satisfy the abrasion resistant preferred manner requirement, but also that less than 50% of the indicia surface area separates from the substrate when subjected to the Wet Scratch Test (hereinafter described).

Scratch Tests for Adhesion

The indicia-containing substrate is placed on a smooth flat surface and using the backside of the investigator's index fingernail portion (with the fingernail in a smoothed out, i.e. filed condition) at a contact angle less than about 30 degrees to the substrate surface, the entire indicia surface area is lightly scratched five (5) times (with a minimal force). The surface area of any removed indicia material is measured relative to the total scratched surface. The surface measurements are based on the substrate area from which indicia material has been removed, compared to the total area of the as-formed indicia. Measurements may for example be made by use of a planimeter. For the Dry Scratch Test there is no wetting. For the Wet Scratch Test, water is sprayed on the underside (opposite the indicia-containing side) of the substrate as mist and in sufficient quantity to form a film. The scratch test is performed immediately thereafter.

Moisture Insensitive

As used herein, "Moisture Insensitive" means that the indicia will not separate from the substrate to any appreciable extent (as evidenced by significant discoloration of the collected water) when the indicia-containing substrate is held under running ambient temperature cold water from a faucet at rate of about 1 U.S. gallon/minute for 30 seconds. This means that the indicia is water insoluble.

Indicia Transfer

For certain embodiments of the indicia substrate-to-edible surface transfer, the surfaces may be contacted at ambient temperature. The need for elevated temperature substrate-edible surface contact for indicia transfer depends on several considerations. These include the types of substrate, edible surface, quantity of water present and desired transfer time. In general it is believed that for high speed commercial processing, the contact time should be minimized and with this requirement elevated temperature contact will be preferred. For complete transfer with minimum contact time, it is also preferred to have at least 60% by wt. water in the edible surface. This will insure adequate lubrication to quickly release the dry indicia from the substrate and transfer same to the edible surface.

EXAMPLE 1

A series of tests were performed to demonstrate suitability of various binder-carriers in the practice of this invention. The same aluminum-organic dye lake was used in all instances and comprised aluminum-brown FD&C lake, the latter being prepared by mixing lakes of Red No. 40 (45.0 wt. % of total), Yellow No. 6 (30.5 wt. % of total) and Blue No. 1 (24.5 wt. % of total), all obtained from Warner-Jenkinson Company, St. Louis, Mo. Five different binder-carriers were used and the general procedure was to mull or mix the liquid and solid constituents of the indicia mixture in the weight percent proportions listed in Table A.

TABLE A

| | Indicia Mixtures | | | | |
| | | | Mixture | | |
| Constituent | A | B | C | D | E |
|---|---|---|---|---|---|
| Zein (1) | 80 | | | | |
| Brown Lake | 20 | 20 | 20 | 20 | 20 |
| Nitrocellulose Lacquer (2) | | 80 | | | |
| Vinyl Lacquer (3) | | | 80 | | |
| Acrylic Varnish (4) | | | | 80 | |
| Polyamide Varnish (5) | | | | | 80 |

(1) Comprises 20 parts zein powder, 70 parts N-propyl alcohol as the solvent and 10 parts water (weight basis).
(2) Comprises 43 parts SS 30/35 cps nitrocellulose resin, type X-1282 (Scholle Corporation) which in turn consists of 70% dry resin and 30% isopropyl alcohol, 14 parts normal propyl acetate, and 43 parts anhydrous ethanol (weight basis).
(3) Comprises 20 parts VYHH resin (Union Carbide Corporation) and 80 parts methyl ethyl ketone (weight basis).
(4) Comprises 20 parts Joncryl type 587 resin (SC Johnson Company) and 80 parts normal propyl acetate (weight basis).
(5) Comprises 30 parts Versamid type 930 resin (Henkel Corporation), 65 parts propyl alcohol and 5 parts heptane (weight basis).

For the tests using indicia mixtures A through E, the substrate was nonreinforced cellulosic casing prepared by the viscose-xanthate process. A drop of the liquid-solid indicia mixture of about $\frac{1}{2} - 182$ inch diameter was placed on the substrate and then drawn down on the substrate using a Meyer metal rod. The solvent was evaporated with hot air.

Tape Test and High Adhesion Bonding (To test adhesion of the indicia to the substrate, a commercially available transparent adhesion tape (#610 marketed by 3M Company) was hand pressed over the indicia, and then hand pulled away from the indicia—first at 90 degrees to the substrate and then at 180 degrees to the substrate surface which is more severe. The tape adhesion surface was examined for color and the indicia inspected for loss of color. If either revealed significant removal of color from the indicia, the latter was deemed to have failed the test, and if there was no significant removal of color the indicia passed the tape test. A most preferred embodiment of the inventive article has "high adhesion bonding" between the substrate and the indicia, and this means the article passes the aforedescribed tape test. The results of the tape test are summarized in Table B.

All indicia were tested for moisture insensitivity and passed the tap water test without significant bleeding.

Abrasion resistance of the indicia was determined using the aforedescribed back-of-fingernail scratch test. This was done with the indicia dry and also with the backside of the indicia-containing substrate wetted with an aqueous solution commercially used in the shirring of cellulosic casing. The test results were numerically rated from 1 (excellent-no loss of indicia) to 5 (very poor-complete loss of indicia). In this rating system 2 was up to about 25% loss of indicia, 3 was between about 26% and about 49% loss of indicia, and 4 was between about 50% and about 74% loss of indicia. This means that a rating of 1, 2 or 3 is acceptable from the standpoint of abrasion resistance.

For transfer to a bologna emulsion surface, a patch of fibrous cellulose casing (about 2–3 in$^2$ size and having the indicia on the viscose coated side) comprising the indicia-containing substrate with the patch on the underside was positioned over the outer surface of the stuffing horn, and a water moisturized size 3½ (3.88 inch flat width) fiber-reinforced celulosic casing was slipped over the end of the stuffing horn and then gathered. The casing functioned as a support for the patch to insure contiguous contact between the indicia and the edible surface. The bologna emulsion was then forced into the casing and the latter was moved by the emulsion pressure off the stuffing horn with the indicia-containing substrate patch in place and positioned against the contiguous moisture-containing bologna emulsion.

The stuffed package was separated from the stuffing apparatus and the open end tied off to eliminate air. The bologna emulsion-containing package was then processed in an oven until the meat temperature reached 80° C.—typically about 3½ hours. The processed package was soaked in room temperature deionized water for 2–3 minutes, i.e. until the casing released from the meat. The patch was then carefully peeled off from the meat and the underlying meat outer surface was examined.

The extent of indicia transfer from the substrate to the bologna surface was visually determined by examining the bologna surface, and results summarized in Table B. Adhesion of the transferred indicia was also evaluated by hand rubbing the indicia on the bologna, and inspecting both the indicia and the hand for transfer. The results of this adhesion test are also summarized in Table B.

TABLE B

Adhesive-Carrier Performance

| Sample No. | Binder-Carrier | Tape Test | Scratch test Dry | Scratch test Wet | After Stuffing & Processing Transfer | After Stuffing & Processing Hand Rub |
|---|---|---|---|---|---|---|
| 1-A | Zein | Passed | 2 | 2 | 100% | No loss |
| 2-B | Nitrocellulose Lacquer | Failed | 1 | 1 | 100% | No loss |
| 3-C | Vinyl Lacquer | Failed | 3 | 3 | 100% | No loss |
| 4-D | Acrylic Varnish | Failed | 3 | 3 | 100% | Slight loss |
| 5-E | Polyamide Varnish | Passed | 1 | 1 | 50% | No loss |

Table B indicates that only samples 1-A (zein) and 5-E (Polyamide varnish) passed the tape (adhesion) test and thus have high adhesion bonding. It is believed that many end uses of the inventive article will not require strong adhesion of the indicia to the substrate, so failure in the tape test does not mean nonsuitability for commercial use. Moreover, the bonding properties of the binder-carrier in securing the indicia to the substrate can probably be improved by adding modifiers. For example, ethylene vinyl acetate resin, polyester resin, dibutyl phthalate plasticizer or tricresyl phosphate plasticizer may be added to nitrocellulose lacquer. Also, a mixture of nitrocellulose lacquer, acrylic varnish and a plasticizer may be used to improve adhesive bonding of the indicia to the substrate. To modify the transfer properties of polyamide varnish as an binder-carrier, the adhesive bonding to the substrate may be reduced by adding nitrocellulose lacquer.

With respect to abrasion resistance of the indicia, scratch test ratings of 1, 2 and 3 are considered acceptable. However, those skilled in the art will recognize that abrasion resistance can probably be further improved by the inclusion of modifiers, as previously discussed.

With the exception of sample 5-E (polyamide varnish) all of the indicia completely transferred from the substrate to the bologna. There was no residual brown color on the substrate. Indicia adhesion to the bologna was excellent, with the exception of sample 4-D (acrylic varnish) where there was only slight loss during the hand rub test.

Example 1 demonstrates that different types of compounds can be used as the binder-carriers in this invention although modifiers may be needed to obtain optimum indicia-substrate adhesion and/or abrasion resistance, or complete indicia substrate-to-edible surface transfer in a particular system as needed for a particular end use.

EXAMPLE 2

This example includes a series of tests on three different samples, performed to demonstrate suitability of thermoplastic films in various surface conditions as substrates in the practice of this invention. The fourth sample is for comparison of substrate-to-edible surface transfer using a commercial pigmented printing ink.

In each test the substrate was an ethylene vinyl acetate (EVA) surface of a commercially employed irradiated multilayer film of about 2 mils thickness. The irradiated substrate was subsequently corona-discharge treated at about 45 dynes/cm. In sample 6-A the substrate film was smooth, in sample 7-A the substrate film contained powdered starch, in sample 8-A the powdered starch was wiped off using a cloth, and in sample 9-F the substrate film contained powdered starch. For the first three samples (6-A, 7-A and 8-A) the same colorant mixture A (Table A) of Example 1 was used, comprising aluminum - brown FD&C lake and zein as the binder-carrier. In sample 9-F a commercially available polyamide and nitrocellulose-type ink containing red pigment 2B was used with no lake or the zein binder-carrier. This pigment comprised about 15 wt. % of a total mixture which included as solvents, 80 wt. % n-propyl alcohol and 20 n-propyl acetate. The experimental procedure was the same as used in Example 1, and the results are summarized in Table C.

| No. | Type Mixture | Tape Test | Scratch Test Dry | Scratch Test Wet | After Stuffing and Processing Transfer | After Stuffing and Processing Hand Rub |
|---|---|---|---|---|---|---|
| 6-A | Brown Lake | Passed | 2 | 1 | 100% | no loss |
| 7-A | Brown Lake | Passed | 2 | 1 | 60% | no loss |
| 8-A | Brown Lake | Passed | 2 | 1 | 30% | no loss |
| 9-F | Red Pigment | Passed | 2 | 1 | 0% | no loss |

(Film Substrate Performance)

All samples passed the tap water test so were moisture insensitive. All samples passed the tape test so demonstrated high adhesion bonding; they also were rated "2" on the dry scratch test so had high abrasion resistance.

However, table C shows that only sample 6-A with the smooth EVA surface provided complete transfer of the indicia to the edible surface, substantiating the smooth substrate surface preferred embodiment of this invention. The powdered starch coated EVA substrate of sample 7-A only provided about 60% indicia transfer, because the starch modified the relationship between the substrate bonding and the edible surface bonding so as to effectively alter the former's bonding force relative to the edible surface bonding force. Wiping off the starch particles from the EVA substrate (sample 8-A) did not restore bonding to that of the original smooth EVA surface (sample 6-A). Instead, this wiping further modified the substrate bonding to increase same relative to the edible surface bonding, resulting in only 30% transfer to the edible surface.

Comparison of sample 9-F with sample 7-A demonstrates that the substrate bonding between the EVA and the dried red pigment indicia was higher than the edible surface bonding, i.e. the bonding force between the dried red pigment indicia and the edible surface. Accordingly, there was no indicia transfer. In contrast, with the brown lake indicia the edible surface bonding, i.e. the bonding force between the dried brown lake indicia mixture and the edible surface, was higher than the substrate bonding, so transfer resulted.

This example also illustrates a preferred article comprising a thermoplastic film casing having on a surface thereof a desired indicia comprising an aluminum - FD&C organic dye lake and zein, with the lake dispersed in the zein and bonded to a surface of the thermoplastic film casing by the zein in a moisture insensitive manner to form the indicia. The latter is substantially completely transferable from the casing to the water moisturized outer surface of a food body during processing thereof in the casing.

EXAMPLE 3

This example comprises a series of tests on three different samples to demonstrate the use of a porous substrate in the practice of this invention.

In each test the same colorant mixture A (Table A) of Example 1 was used comprising aluminum-brown FD&C lake and zein as the binder-carrier. In sample 10-A the substrate was uncoated paper, in sample 11-A the substrate was the uncoated paper side of fiber (paper) reinforced cellulosic casing prepared by viscose coating on the opposite side. In sample 12-A the substrate was a saran coating (vinylidene chloride-vinyl chloride copolymer) on the uncoated paper side of the same type of fiber reinforced cellulosic casing used with sample 11-A. The experimental procedure was the same as that described in connection with Example 1 except that a slice of turkey lunchmeat was used as the edible surface and the samples were tested for indicia transfer at both ambient temperature and 60° C. The substrate-edible food combinations were each pressed together by wrapping in aluminum foil and examined after 20 minutes contact. Transfer was 100% for all samples at both temperatures. All three colorant mixture-coated samples passed the tap water test so were moisture-insensitive. The tape, abrasion and indicia transfer tests are summarized in Table D.

TABLE D

| | | Porous Substrate | | | |
| | Tape | Scratch Test | | After Stuffing and Processing | |
| No. | Test | Dry | Wet | Transfer | Hand Rub |
| --- | --- | --- | --- | --- | --- |
| 10-A | Passed | 1 | 1 | 100% | No loss |
| 11-A | Passed | 2 | 2 | 100% | No loss |
| 12-A | Passed | 2 | 2 | 100% | No loss |

Table D demonstrates that a porous substrate such as paper may be used in the practice of this invention, and that for at least one edible product (turkey lunchmeat) the indicia transfer may be realized at ambient temperature.

In another series of similar tests using uncoated paper substrate and the uncoated paper side of fiber reinforced cellulose casing as the indicia substrate, a bologna emulsion was used as the edible surface and processed to form a frankfurter. Although it appeared that the indicia substantially completely transferred to the frankfurter, the paper-frankfurter bond was too strong to permit peeling without tearing. Apparently the meat emulsion penetrated the porous paper substrate inner body and formed a strong bond. It is possible that a peeling aid coating on the paper substrate would prevent such penetration and permit separation. In effect this might change the substrate surface from porous to nonporous. It should also be noted that in Example 1, the substrate was the viscose-coated side of fibrous cellulose casing and there was no problem separating the substrate from the indicia-containing frankfurter. It appears that in effect the viscose formed a nonporous coating over the porous paper layer and prevented penetration by the emulsion during processing.

EXAMPLE 4

This series of tests was performed to demonstrate that moisture is needed for indicia transfer in accordance with this invention. The tests also demonstrate that for successful transfer, nonaqueous fluids may not be used instead of moisture.

For each sample the same colorant mixture A (Table A) of Example 1 was used comprising aluminum-brown FD&C lake and zein, and the substrate was the same type of nonreinforced cellulosic casing. In all instances, the edible surface was white bread (a single slice) and the colorant coating was applied to the cellulose substrate in the Example 1 manner. These articles passed the tape test, the tap water test for moisture insensitivity, and provided a high abrasion resistance rating of 2 in both the Wet Scratch Test and the Dry Scratch Test.

The bread was either dry or treated with about 30% liquid (total weight basis) of four different types. The indicia transfer from the cellulose substrate to the contiguous edible (bread) surface was attempted at room temperature by placing the indicia in contact with the bread and pressed together by wrapping the combination in aluminum foil for 20 minutes contiguous contact. Indicia transfer was also attempted at elevated temperature of 60° C. by heating the combination for 20 minutes. The results of these tests are summarized in Table E.

TABLE E

Water Moisture for Transfer

| No. | Bread Condition | Transfer Temperature | Transfer |
| --- | --- | --- | --- |
| 13-A | Dry | Ambient | 0% |
| 13-A | Dry | 60° C. | 25% |
| 14-A | Water Moisturized | Ambient | 80% |
| 14-A | Water Moisturized | 60° C. | 100% |
| 15-A | Mineral Oil Treated | Ambient | 0% |
| 15-A | Mineral Oil Treated | 60° C. | 0% |
| 16-A | Glycerine Treated | Ambient | 0% |
| 16-A | Glycerine Treated | 60° C. | 0% |
| 17-A | Vegetable Oil Treated | Ambient | 0% |
| 17-A | Vegetable Oil Treated | 60° C. | 0% |
| 18-A | Propylene Glycol Treated | Ambient | 5% |
| 18-A | Propylene Glycol Treated | 60° C. | 10% |

Table E shows that with dry bread of sample 13-A there was very little indicia transfer even at elevated temperature. This was probably because there was not enough water present to perform the lubricating function of aiding indicia release from the substrate and movement to the edible food. In contrast, there was substantial transfer of the indicia with water moisturized bread at ambient temperature and complete transfer at elevated temperature (14-A). The latter probably sufficiently increased the energy and hence lubricity of the water to achieve the desired indicia release from the substrate and movement to the contiguous bread surface.

Tests with samples 15-A (mineral oil), 16-A (glycerine), 17-A (vegetable oil), and 18-A (propylene glycol) show there was no appreciable transfer of indicia to the nonaqueous liquid treated bread even at elevated temperature. A probable explanation is that the cellulose substrate-zein interface was not softened by these nonaqueous liquids so there was no release from the substrate, i.e. zein is not partially soluble in these liquids.

EXAMPLE 5

This pair of tests was performed to demonstrate that the indicia transfer aspect of the invention may not be practiced with a contiguous water moisturized ceramic tile (nonedible) surface. In each test the same colorant mixture A (Table A) of Example 1 was used comprising aluminum-brown FC&C lake and zein, and the substrate was the same vinylidene chloride-vinyl chloride copolymer coated fiber-reinforced cellulosic casing used in Example 3. The colorant coating was applied to the thermoplastic substrate in the Example 1 manner.

The nonedible surface was the porous side of a ¼ inch thick ceramic tile of about 8 in² surface, and the latter was moistened by 5 gms. water. Another identical tile was moistened by 5 gms. mineral oil.

It was attempted to transfer the indicia from the thermoplastic substrate to the water moistened contiguous porous ceramic surface at room temperature (sample 19-A). This was unsuccessful. Indicia transfer was then attempted with the two types of liquid moistened tile by heating the thermoplastic surface and contiguously associated moisturized porous ceramic surface combinations to 60° C. (samples 20-A with water and sample 21A with mineral oil). Again there was no indicia transfer, and this was probably in part because of insufficient moisture at the indicia-tile interface to allow swelling of the zein - ceramic tile interface. Another possible reason is that the indicia-tile bonding was either less than the indicia-substrate bonding or did not sufficiently exceed the latter for transfer to occur.

EXAMPLE 6

These tests demonstrate that the indicia transfer aspect of the invention may be practiced with collagen as the substrate and also with a variety of edible surface types.

For each sample the same colorant mixture A (Table A) of Example 1 was used comprising aluminum-brown FD&C lake and zein. The colorant mixture was applied to the substrate in the Example 1 manner.

In sample 22-A the substrate was collagen and the edible surface was turkey-bologna lunchmeat. In sample 23-A the substrate was the viscose coated nonporous and smooth side of fiber (paper) reinforced cellulosic casing and the edible surface was processed cheese. In sample 24-A the substrate was the EVA nonporous and smooth surface of a multilayer thermoplastic film with a 36 dynes/cm. corona treatment and the edible surface was pie dough. Each of these edibles provided a moisture-containing outer surface for contact with the indicia. The indicia containing substrate and the edible surfaces were positioned in contiguous contact by the Example 1 procedure, and the combinations were processed at elevated temperature. The results of these tests are summarized in Table F.

TABLE F

| Sample No. | Tape Test | Edible Surfaces | | | |
|---|---|---|---|---|---|
| | | Scratch Test | | After Stuffing and Processing | |
| | | Dry | Wet | Transfer | Hand Rub |
| 22-A | Passed | 1 | 2 | 100%[1] | No loss |
| 23-A | Passed | 1 | 1 | 100%[1] | No loss |
| 24-A | Failed | 5 | 5 | 100%[2] | No loss |

[1]Processing conditions were 50° C. for 30 minutes.
[2]Processing conditions were initially 60° C. for 30 minutes, but there was no transfer. The combination was further processed at 80° C. for an additional one hour, and transfer was complete.

Table F demonstrates that different types of edible surfaces may be used, and the indicia transfer conditions may vary. The pie dough test (sample 24-A) failed the tape test and the scratch tests because the corona treatment level of the EVA film substrate was too low for bonding of the indicia thereto. In this respect it should be noted that sample 6-A of Example 2 and Table C also comprised an EVA substrate-brown lake combination, and passed both the tape test and the scratch tests because of the higher level corona treatment, i.e. 45 dynes/cm.

EXAMPLE 7

This series of experiments demonstrate that although elevated temperature contact between the indicia-containing substrate and the edible surface is preferred for many end uses, it is not essential for the indicia transfer aspect of this invention.

A mixture comprising 18 gms FD&C brown lake, 64 gms zein, 16 gms normal propyl alcohol and 2 gms deionized water (i.e. 16% zein, 56% alcohol, 20% lake and 8% water) was prepared and applied to a 2 mil thick corona-treated (about 45 dynes/cm.) thermoplastic monolayer film consisting of an ethylene vinyl acetate—polyethylene blend. The application, rolling and solvent drying procedure was the same as used in Example 1.

Sliced turkey-bologna lunchmeat and fresh uncooked chicken parts were used as the edible surfaces for the indicia transfer tests. A 2-3 in² section of the indicia-containing film was placed on the turkey-bologna surface. The combination was wrapped in aluminum foil. The sample A-25 combination was unwrapped after 5 minutes at ambient temperature and indicia transfer was about 80% complete. The combination was rewrapped and left at ambient temperature for another 20 minutes; indicia transfer from the film substrate to the turkey-bologna was complete.

Two additional film substrate turkey-bologna combinations identical to sample A-25 were prepared, wrapped in aluminum foil and placed in an oven at 60° C. For sample 26-A the package was removed after 10 minutes and the indicia transfer was complete. For sample 27-A the package was removed from the oven after 20 minutes and the indicia transfer was also complete.

For sample 28-A a fresh piece of chicken breast was used as the edible surface. The indicia-containing thermoplastic film was positioned in contiguous contact with the chicken, and the combination wrapped in aluminum foil. Indicia transfer to the chicken surface was complete after cooking for 90 minutes at 325° F. in an oven. This test demonstrates that the invention can be used to transfer indicia to poultry as the edible surface. Although only chicken was tested it is believed that indicia transfer would be successful to other types of poultry as for example turkey and duck.

EXAMPLE 8

A series of tests were performed which demonstrate the need for inclusion of aluminum lake in the indicia-forming mixture to practice this invention.

For these tests, three different FD&C dyes were mixed with zein binder-carrier and used to form indicia in the unlaked and laked forms. The dyes were Red No. 40, Yellow No. 6 and Blue No. 1. The unlaked mixtures were prepared by mixing 7.0 wt. % dye and 93.0% "Aqua Zein" purchased from Freeman Industries, Tuckahoe, N.Y. The latter in turn comprises 10 wt. % zein and 90 wt. % propylene glycol, water and ammonia. The laked mixtures comprised 20 wt. % lake and 80% zein - solvent; the latter in turn consisted of 20% zein powder, 67.5% N-propyl alcohol, 7.5% water and 5.0% butyl cellosolve, all on a weight basis. The weight ratio zein/FD&C dye was the same or similar in the unlaked Aqua Zein and laked mixtures although the solvent systems were somewhat different. This difference was due to difficulties in solubilizing the unlaked mixture. Another unlaked mixture was prepared by mixing 56% N-propyl alcohol, 20% water, 16% zein powder and 8% Blue No. 1 FD&C dye (all on weight % basis). This N-propyl alcohol type unlaked mixture had the same zein/FD&C dye weight ratio as the unlaked Aqua Zein and laked mixtures. All of those mixtures were considered to have good print strength.

The substrate was the same type of nonreinforced transparent cellulosic casing used in Example 1, and the indicia were applied to the casing outer surface by brush to simulate grill marks, as for example illustrated in FIG. 2. The grill marks were about ⅛ inch wide, about 1 inch long and about 1 inch apart, center-to-center. All of the unlaked Aqua Zein indicia were applied to the same casing and all of the laked indicia were applied to the same casing. The N-propyl alcohol type unlaked indicia was applied to a separate casing. The solvent was evaporated by hot air, leaving dried indicia.

The indicia-containing cellulose casings were then subjected to the tape test and the moisture insensitivity tests. On the tap water test, there was extensive running of the dye in all unlaked samples (i.e. both the Aqua Zein and the N-propyl alcohol types) so they were moisture sensitive. In contrast there was no loss of color for any of the laked samples so all were moisture insensitive. On the tape test, all indicia (both unlaked and laked) pulled off the cellulose substrate to a substantial extent. This was probably due to the brush painting method of application, i.e. as a thick coating rather than as a thin rolled layer.

The laked and unlaked Aqua Zein indicia-containing cellulose casings were then reverse stuffed with water moisture-containing bologna emulsion using the Example 1 stuffing apparatus, and the stuffed package ends tied to eliminate air. Visual inspection of the unprocessed packages revealed a striking difference between the laked and unlaked indicia. The former were as sharp and distinct as they appeared on the casing before stuffing, but the unlaked indicia smeared badly during stuffing. The bologna emulsion-containing packages were then processed in an oven until the meat temperature reached 80° C., i.e. about 2 hours. The so-processed packages were then soaked in room temperature deionized water long enough for the casing to release from the meat, and the casing removed from the underlying meat outer surface for physical examination.

The laked indicia transfer from the cellulose substrate was substantially complete for all three FD&C colors, with no smearing or bleeding out during processing. The unlaked indicia transfer was substantial, but the smearing and bleeding out (observed during stuffing) became more pronounced during processing. It was so extensive that the simulated grill marks were not distinct and tended to run together. In contrast, the laked indicia on the processed meat were sharp and distinct. The results of these tests are summarized in Table G.

TABLE G

| Sample No. | Color | Lake Present | Scratch Test Dry | Scratch Test Wet | Indicia After Stuffing | Indicia After Processing |
|---|---|---|---|---|---|---|
| 28-A | Red | Yes | 2 | 2 | Sharp | Sharp |
| 29-A | Red | No | 2 | 2 | Partially Blurred | Partially Blurred |
| 30-A | Yellow | Yes | 2 | 2 | Sharp | Sharp |
| 31-A | Yellow | No | 2 | 2 | Partially Blurred | Partially Blurred |
| 32-A | Blue | Yes | 2 | 2 | Sharp | Sharp |
| 33-A | Blue | No | 2 | 2 | Partially Blurred | Partially Blurred |

On the scratch test (both wet and dry) all indicia (both unlaked and laked) were rated "2" because no significant quantity of material was removed.

On the hand rub test, there was no loss of material for any of the transferred laked indicia, but there was substantial loss of material for all of the transferred unlaked indicia.

It will be apparent from this Example 8 that use of lakes is essential to this invention from several standpoints, i.e. to provide moisture insensitivity and sharp, distinct indicia on both the substrate and edible surface.

EXAMPLE 9

In this example a two color indicia-containing nonreinforced cellulosic food casing was prepared in accordance with this invention, using commercial printing equipment.

One of the indicia-forming colors was prepared by thoroughly mixing 20 pounds of FD&C brown lake (manufactured by Warner-Jenkinson Company) with 80 pounds of zein binder-carrier. The latter comprised 20 parts zein powder, 72.5 parts N-propyl alcohol and 7.5 parts water (weight basis). The mixing procedure was to add the brown lake to the zein under high speed agitation and mix for 30 minutes.

The other indicia-forming color was prepared by mixing 20 pounds of FD&C red lake (also manufactured by Warner-Jenkinson Company) with 80 pounds of zein binder-carrier. The latter comprised 20 parts zein powder, 72.5 parts N-propyl alcohol 7.5 parts water (weight basis). The mixing procedure was the same as employed with the brown lake - zein mixture.

The casing used in this test was regular (no peeling aid) nonreinforced cellulose casing manufactured by Viskase Corporation using the viscose-xanthation process, designated size 24 and having 1.30 inch flat width. This casing was from a production lot but diverted from the production system prior to shirring.

The indicia to be printed on the casing outer wall was the mirror image of ARMOUR ® including that company's star logo with the letters about 5/16-inch high (in brown) and the star about 5/16-inch high (brown and red). The indicia repeated every 2 inches along the casing length, with all indicia positioned on the same central axis as for example illustrated in FIG. 6.

The printing apparatus used to apply the two color indicia was a flexographic press system as generally illustrated in FIG. 1. The printing procedure was as previously described in connection with FIG. 1, using separate printing heads for the two colors. The indicia-containing cellulosic casing prepared in the aforedescribed manner was examined on the basis of the aforedescribed criteria and met all requirements. More specifically, the indicia resolution was excellent, and easily readable. The indicia was bonded to the cellulose substrate in a high abrasion resistant manner because less than 30% of the indicia surface area was removed by the Wet Scratch Test and less than 10% of the indicia surface area was removed by the Dry Scratch Test. The indicia was also bonded to the cellulose substrate in a moisture insensitive manner because there was no appreciable separation during the Tap Water Test.

The aforedescribed indicia-containing cellulose casing was then shirred and compressed to a pack ratio of about 82 using commercial equipment of the standard fixed mandrel type operated at production rate of about 1200 ft/min to produce shirred sticks. During shirring, the stick pleat twist was oriented opposite to the FAM spinning direction in accordance with the aforereferenced U.S. Pat. No. 4,649,961. There was no casing breakage during shirring. Visual examination of the indicia after partial deshirring (by hand) indicated no damage.

This example demonstrates that the cellulosic food casing embodiment of invention article can be manufactured with commercial equipment at a commercial production rate.

This example also demonstrates a preferred article comprising a shirring cellulosic food casing having on a surface thereof a desired indicia comprising an aluminum-FD&C organic dye lake and zein, with the lake dispersed in the zein and bonded to a surface of the casing by the zein in a moisture insensitive manner to form the indicia. The latter is substantially completely transferable from the casing surface to the water moisturized outer surface of a food body during processing thereof in the casing as demonstrated in the following Example 10.

EXAMPLE 10

In this example, the Example 9 two-color indicia-containing shirred cellulose casing was used to produce a frankfurter emulsion-containing package having the emulsion in direct contact with the indicia.

This shirred and reverse twisted casing was stuffed with a commercially available frankfurter meat emulsion formulation comprising 50 lbs. beef chuck, 50 lbs. regular pork trim, 2¼ lbs. salt, 25 lbs. water, 1 lb. spice and 40 oz. Prague. The stuffing machine was the aforedescribed FAM type operated at about 220 fpm. casing and the stuffing horn was Teflon-coated. During stuffing the casing was deshirred and inverted through the bore of the stick so the casing turned inside out. This located the processable moisturized frankfurter emulsion in direct contact with the indicia.

This example demonstrates that the frankfurter emulsion-cellulose casing processable food package embodiment of the invention can be prepared with commercial equipment using a commercial production rate.

This example also demonstrates a preferred processable food package comprising a cellulosic casing filled with water moisture-containing processable food having its water moisturized outer surface in direct contact with the casing inner surface, wherein the latter is a substrate for an aluminum-organic dye lake and binder-carrier. The lake is dispersed in the binder-carrier and bonded to the casing inner surface by the binder-carrier in a moisture insensitive manner as a desired indicia. The latter is substantially completely transferable from the casing inner surface to the water moisturized food outer surface during processing thereof in the casing, as demonstrated in the following Example 11.

EXAMPLE 11

In this example, the Example 10 frankfurter emulsion-indicia containing cellulose casing package was used to produce frankfurter with the desired two color indicia on its outer surface.

The aforedescribed package was cooked in a smoke house at 180° F. using 25% relative humidity until the internal temperature reached 160° F., then water showered for 10 minutes for cooling to about 40° F. The casing was then hand-peeled.

During hot processing, the indicia simultaneously substantially completely transferred from the casing inner surface to the moisture-containing frankfurter outer surface. This was apparent because visual inspection of the frankfurter outer surface revealed substantially complete coverage of the indicia contact area by either of the two colors. Moreover the indicia definition on the frankfurter surface was very clear, although the colors were somewhat less bright than the original indicia on the cellulose casing outer surface. Examination of the peeled casing revealed substantially complete transfer of the indicia from the casing surface to the frankfurter surface. There was no loss of indicia when the latter was hand-rubbed on the frankfurter surface.

In other tests with substantially identical processed packages, the casing was peeled from the frankfurter surface by a commercial-type (Apollo Ranger) peeler at speed of about 500 fpm, and the indicia remained undamaged on the frankfurter surface.

This example demonstrates that the indicia-containing frankfurter edible food embodiment of the invention can be prepared with commercial equipment using a commercial production rate.

This example also demonstrates a preferred edible food product comprising a frankfurter having on its outer surface a desired indicia of aluminum-FD&C brown dye lake and zein, with the lake dispersed in the zein and bonded to the frankfurter outer surface by the zein.

EXAMPLE 12

In this example, shellac was used as the binder-carrier instead of zein as used in the previous examples.

The indicia-forming color was prepared by mixing 20 lbs. of FD&C brown lake with 80 lbs. of shellac, the latter comprising 20% food grade dewaxed white shellac and 80% normal propyl alcohol.

The substrate was the same type of regular (no peeling aid) nonreinforced cellulose casing used in Example 9.

The indicia to be printed on the casing outer wall was the mirror image of grill marks 5/16 inch high, 3/32 inch wide and repeated every ¾ inch along the casing length, as for example shown in FIG. 2.

The printing apparatus used to apply the shellac-containing indicia was the same flexographic pres system used in Example 9, and the printing procedure was as previously described in connection with FIG. 1.

The indicia-containing cellulosic casing prepared in the aforedescribed manner was examined on the basis of the aforedescribed criteria and met all requirements. More specifically, the indicia resolution was excellent and easily readable. The indicia was bonded to the cellulose substrate in a high abrasion resistant manner because less than 30% of the indicia surface area was removed by the Wet Scratch Test and less than 10% of the indicia surface area was removed by the Dry Scratch Test. The indicia was also bonded to the cellulose substrate in a moisture insensitive manner because there was no appreciable separation during the Tap Water Test.

The aforedescribed indicia-containing cellulose casing with shellac binder-carrier was shirred and compressed to a pack ratio of about 82 in the same manner as Example 9. There was no casing breakage during shirring and visual examination of the shirred stick indicia (by inspection of hand-deshirred casing) indicated no damage.

Another portion of this indicia-containing casing was stuffed with bologna and processed in the Example 1 manner. The casing was hand-peeled from edible food outer surface and examination revealed that indicia transfer was 100%. There was no loss of indicia when the bologna was hand rubbed.

These tests demonstrate that from a functional standpoint, shellac is fully equivalent to zein as a binder-carrier in the practice of this invention.

EXAMPLE 13

In this example, a series of indicia-containing frankfurters were produced in accordance with this invention as described in Examples 9–11 with different color indicia, and encased in evacuated plastic packages of the type available in grocery stores. The indicia were red and brown, and the packages were stored at 40° F. (40° C.) for a period of five weeks to test color stability of the indicia. The red indicia were prepared by mixing the following lakes: Red No. 40 and Yellow No. 6. The brown indicia were prepared by mixing the following lakes: Red No. 40, Yellow No. 6 and Blue No. 1.

The red indicia showed no color change but the brown indicia experienced significant color fading. The blue lake component of the brown indicia is believed responsible for this color change as it is the most unstable. The mechanism is probably related to the pH change which occurs during the storage of perishable foods such as meat. Possibly the color change may be at least retarded and even avoided by the incorporation of buffers, chelating agents or more asceptic packaging. Once spoilage has occurred with the concurrent acidity increase, the food body is of no use. Freezing and/or proper storage of the food body will prolong the indicia life to that of the perishable food body.

EXAMPLE 14

In these tests it was demonstrated that transfer of indicia from nonreinforced cellulose casing substrate to a frankfurter surface in the casing (during processing) is more complete if a peeling aid coating is first applied to the substrate. That is, the transferred indicia color is more distinct if the cellulose substrate has an underlying peeling aid coating. Examination of the substrate after indicia transfer revealed that with the peeling aid coating, essentially no indicia residue remains whereas without the peeling aid coating there is some indicia residue although the indicia transfer was still substantially complete, as previously defined.

The probable reason for this difference is that the peeling aid reduces the substrate bonding, thereby increasing the difference between substrate bonding and edible surface bonding.

In these tests, a thin layer of carboxymethylcellulose peeling aid (about 1.6 mg/100 in$^2$) was applied to the casing external surface from an aqueous solution immediately following casing extrusion and before drying. The coated casing then dried and the indicia thereafter applied using the FIG. 1 flexographic system. The indicia-containing cellulose casing was then shirred in the Example 9 manner, used to produce a frankfurter emulsion-containing package by reverse stuffing as described in Example 10 with a FAM Machine, and processed in accordance with Example 11. Other peeling aids, as previously described, could be used.

Accordingly, a preferred embodiment of the invention employs a peeling aid coating on a cellulose casing substrate under the indicia.

While this invention has been described with reference to certain specific embodiments, it will be recognized by those skilled in this art that many variations are possible without departing from the scope and spirit of the invention.

What is claimed is:

1. An article comprising a substrate having thereon a desired indicia comprising an aluminum-organic dye lake and a binder-carrier, with said lake dispersed in said binder-carrier and bonded to the substrate by said binder-carrier in a moisture insensitive manner to form said indicia, with said indicia being substantially completely transferable from said substrate to a contiguous edible surface in the presence of water.

2. An article according to claim 1 wherein said substrate is nonporous.

3. An article according to claim 1 wherein said substrate is flexible.

4. An article according to claim 1 wherein said substrate is plasticized cellulose.

5. An article according to claim 1 wherein said substrate is smooth.

6. An article according to claim 1 wherein said substrate is cellulose casing prepared by the viscose-xanthation process.

7. An article according to claim 1 wherein said substrate is thermoplastic film.

8. An article according to claim 1 wherein said substrate comprises ethylene vinyl acetate thermoplastic film.

9. An article according to claim 1 wherein said substrate comprises polyethylene thermoplastic film.

10. An article according to claim 1 wherein said substrate comprises a thermoplastic film copolymer of ethylene and an alpha olefin having between 3 and 8 carbon atoms.

11. An article according to claim 1 wherein said substrate comprises a thermoplastic film blend of ethylene vinyl acetate and polyethylene.

12. An article according to claim 1 wherein said binder-carrier is zein.

13. An article according to claim 1 wherein said binder-carrier is shellac.

14. An article according to claim 1 wherein the organic dye in said lake is an FD&C color.

15. An article according to claim 1 wherein said organic dye in said lake is an FD&C brown blend.

16. An article according to claim 1 wherein said organic dye in said lake is an FD&C yellow.

17. An article according to claim 1 wherein said organic dye in said lake is an FD&C red.

18. An article according to claim 1 wherein said organic dyed in said lake is an FD&C blue.

19. An article according to claim 1 wherein said indicia is spaced grill-like marks.

20. An article according to claim 1 wherein said lake dispersed in said carrier is bonded to said substrate in an abrasion resistant manner.

21. An article according to claim 1 wherein said lake dispersed in said carrier is bonded to said substrate in a high abrasion resistant manner.

22. An article according to claim 1 wherein said substrate and said indicia have high adhesion bonding.

23. An article comprising a cellulosic casing having a peeling aid on a surface thereof and a desired inidicia bonded to the peeling aid-coated surface, said indicia comprising an aluminum-organic dye lake and a binder-carrier with said lake dispersed in said binder-carrier and bonded to said peeling aid-coated surface by said binder-carrier in a moisture insensitive manner to form said indicia, with said indicia being substantially completely transferable from said peeling aid-coated surface to a contiguous edible surface in the presence of water.

24. An article comprising a shirred cellulosic food casing having on a surface thereof a desired indicia comprising an aluminum - FD&C organic dye lake and zein, with said lake dispersed in said zein and bonded to a surface of the cellulosic casing by said zein in a moisture insensitive manner to form said indicia, said indicia being substantially completely transferable from said cellulosic casing surface to the water moisturized outer surface of a food body during processing thereof in said casing.

25. An article according to claim 24 wherein said FD&C organic dye is brown and said indicia is spaced grill-like marks.

26. An article according to claim 24 wherein said indicia is a logo.

27. An article comprising a shirred thermoplastic film casing having on a surface thereof a desired indicia comprising an aluminum-FD&C organic dye lake and zein, with said lake dispersed in said zein and bonded to a surface of thermoplastic film casing by said zein in a moisture insensitive manner to form said indicia, said indicia being substantially completely transferable from said thermoplastic film casing to the water moisturized outer surface of a food body during processing thereof in said casing.

28. An article comprising a shirred cellulosic food casing having on a surface thereof a desired indicia comprising an aluminum-FD&C organic dye lake and shellac, with said lake dispersed in said shellac and bonded to a surface of the cellulosic casing by said shellac in a moisture insensitive manner to form said indicia, said indicia being substantially completely transferable from said cellulosic casing surface to the water moisturized outer surface of a food body during processing thereof in said casing.

29. An article according to claim 28 wherein said FD&C organic dye is brown and said inidicia is spaced grill-like marks.

30. An article according to claim 28 wherein said indicia is a logo.

31. An article comprising a shirred thermoplastic film casing having on a surface thereof a desired indicia comprising an aluminum-FD&C organic dye lake and shellac with said lake dispersed in said shellac and bonded to a surface of said thermoplastic film casing by said shellac in a moisture insensitive manner to form said indicia, said indicia being substantially completely transferable from said thermoplastic film casing to the water moisturized outer surface of a food body during processing thereof in said casing.

* * * * *